July 25, 1961  A. N. ALLEN, JR  2,993,543
MULTIPLE-AREA HYDRAULIC MOTOR
Filed July 30, 1957  2 Sheets-Sheet 1
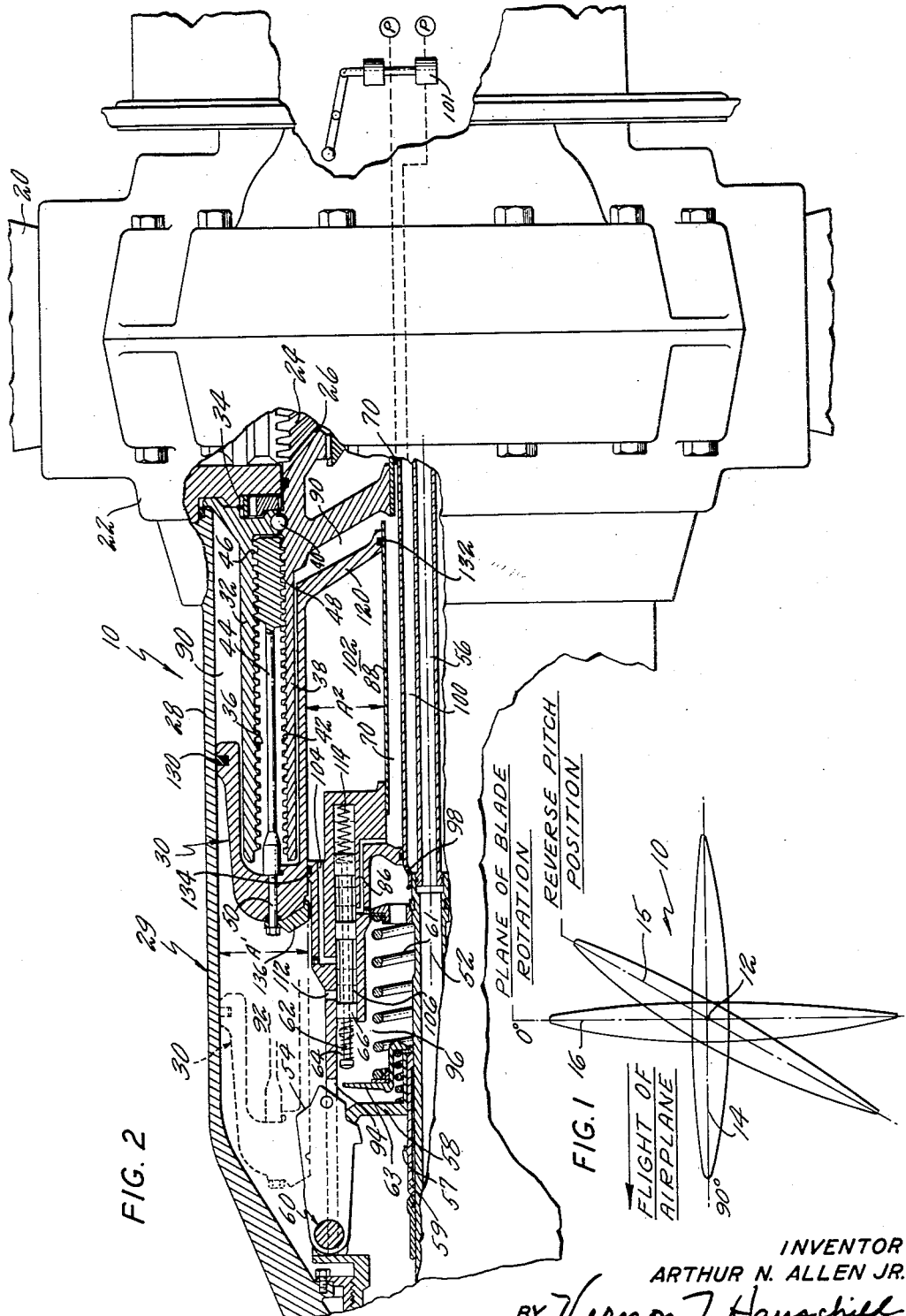
INVENTOR
ARTHUR N. ALLEN JR.
BY Vernon F. Hauschild
ATTORNEY July 25, 1961  A. N. ALLEN, JR  2,993,543
MULTIPLE-AREA HYDRAULIC MOTOR
Filed July 30, 1957  2 Sheets-Sheet 2

INVENTOR
ARTHUR N. ALLEN JR.
BY Vernon F. Hauschild
ATTORNEY

United States Patent Office 2,993,543
Patented July 25, 1961

2,993,543
MULTIPLE-AREA HYDRAULIC MOTOR
Arthur N. Allen, Jr., Wethersfield, Conn., assignor to United Aircraft Corporation, East Hartford, Conn., a corporation of Delaware
Filed July 30, 1957, Ser. No. 675,117
6 Claims. (Cl. 170—160.32)

This invention relates to propellers of the type used on powerplants such as aircraft engines and more particularly to an hydraulically operated variable pitch propeller and the means for causing the propeller blades to rotate relative to the propeller hub.

It is an object of this invention to use an oil motor of a design that maintains a constant relationship between translation and rotation, such motor having the translating or piston member divided into two separate areas so that fluid may be directed to one or both regions thereby altering the output characteristics to be more suitable for propeller use.

It is a further object of this invention to use helical or spiral splines to cause the propeller blades to rotate relative to the hub and to amplify rotation by utilizing spiral splines of opposite rotation jointly and further to diminish motion resistance and friction by utilizing ball bearings to transmit the load between the spiral splines.

Other objects and advantages will be apparent from the following specification and claims, and from the accompanying drawings which illustrate an embodiment of the invention.

In the drawing:

FIG. 1 is a superimposed showing of propeller blade positions.

FIG. 2 is a cross-sectional showing of a practical embodiment of my invention.

Figure 3:
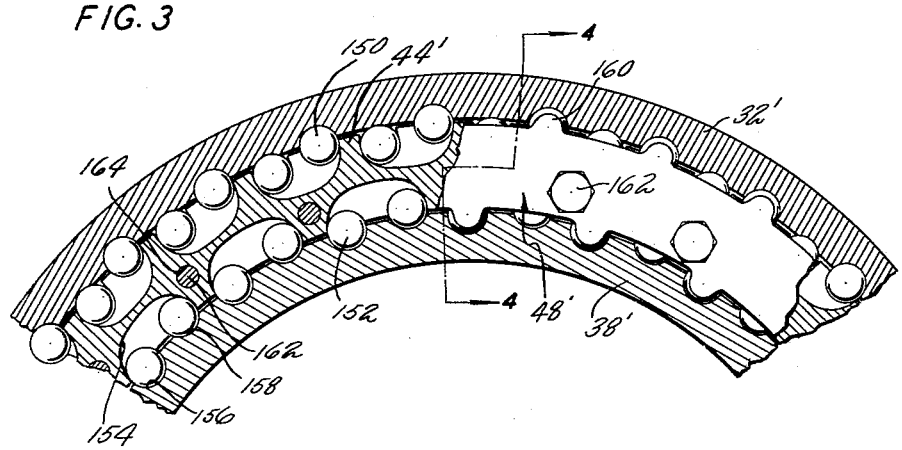
FIG. 3 is a fragmentary rear view of my invention, partially broken away, to illustrate the use of ball bearing chains therewith.

Referring to FIG. 1 we see superimposed showings of propeller blade unit 10 showing blade cross-sections pivoted about blade longitudinal axis 12 and shown in its full feather or high pitch position along 90° line 14, shown in its zero pitch position along zero degree line 16 and in its reverse position along line 15.

Each metallic particle of a propeller blade that is offset from the plane of rotation of the pitch change axis tends to rotate the blade in such a direction as to enter this plane. As a result of this, the entire blade will tend to return to the zero pitch position when rotated toward feather or reverse. It is possible that the aerodynamic forces combined with the physical forces stated above will require a large moment to maintain the blades between 20° and 40° positive blade angle. The blade pitch change mechanism is usually provided with stops which prevent the blades from rotating below a prescribed pitch angle. This is to prevent the blades from entering a region near the zero degree blade angle where the propeller torque will not support engine torque without speed destructive tendency. These stops are usually designed to be removed upon the signal of the pilot for reverse blade pitch. It is not required for the pitch change motor to have high moments for pitch control below the low pitch stop position but rather it is more important to have rapid pitch change rate so that the blades will pass through the zero angle range rapidly on the way to reverse, thereby minimizing engine acceleration.

A practical embodiment of my multiple area oil motor blade rotating system is shown in FIG. 2, and while any number of effective areas could be used, for purposes of explanation, a double area motor has been chosen. Propeller unit 10 is shown to comprise a plurality of blades 20 which are retained to rotate with propeller hub 22. Blades 20 are provided with beveled gear 24 at their inner ends, which is driven by beveled gear 26. Attached to propeller hub 22, as shown in FIG. 2, is a dome unit 29 housed by cylinder 28 which acts as a cylinder within which hydraulically operated double-area piston unit 30 is actuated. It will further be noted that sleeve 32 is fixed for rotation with propeller hub 22 through spline connection 34. Sleeve 32 may rotate with hub 22 but is otherwise fixed in position and has female splines 36 along its inner surface. Sleeve 38 carries beveled gear 26 and is positioned by bearing 40 such that it is capable of rotation only and not of translation and has male splines 42 on its outer surface. Splines 36 and 42 are preferably helical splines and are of opposite hand. Sleeve 44 projects between sleeves 32 and 38 and carries male splines 46 on its outer surface, which are helical and designed to mate with female splines 36 of sleeve 32 and also carries female splines 48 on its inner surface which are helical and adapted to mate with male splines 42 of member 38. Accordingly, helical male spline 46 and female spline 48 on sleeve 44 are of opposite hand. Sleeve 44 is attached to piston unit 30 by any convenient means such as bolts 50 and translates and rotates therewith. It will be observed that, due to the helical splines, namely 36—46, sleeve 44 will be caused to rotate at a given rate as piston unit 30 is moved fore and aft in translation axially along center line 52 of propeller unit 10 and helical splines 42—48 will cause sleeve 38 to rotate at double that speed, if the axial splines are of similar pitch but opposite hand. Obviously, by spline pitch variation, the degree of rotation of sleeves 44 and 38 may be varied as desired.

Ring 58 which positions stops 54 is retained in position as shown by spring 61 acting through ring 63. Valve 66 is retained in its normal forward position by spring 114 and is shifted to the phantom position in the following manner. As fully described in U.S. Patent Nos. 2,704,583 and 2,843,212, when the pilot wishes to reverse the propeller pitch he causes the control system to direct fluid through the low pitch stop control line 56 to actuate a piston, not shown, which in turn moves sleeve 59 and ring 63 aft or axially to the right against the force of spring 61. As this motion continues, ring 57 contacts support ring 58 which moves aft or axially to the right together with ring 63. As support ring 58 moves to the right it permits stop levers 54 to swing inward about pins 60 under the piston 30 load. The piston may then assume the reverse position by sliding over the collapsed stop levers to the piston position shown in phantom in FIG. 2.

Piston 30 is sealed at the cylinder 28 by sealing ring 130 and at its inner diameter by seal 132 against the fixed tube 88. The forward face of the piston 30 is divided by seal 134 into outer area ($A_1$) and inner area ($A_2$). During normal propeller operation, fluid pressure is present in passage 100 which is connected to the outer piston region 92, aperture 98 and through to the inner region 102 through valve 66. The pressure is thus directed over the face of the whole piston, area $A_1$ and $A_2$ and thus the highest output torque is obtained in relation to pressure load.

Ring 63 translates the valve 66 as the low pitch latches 54 are released for reverse pitch operation. This action takes place through push rod 62 which is retained in position with respect to valves 66 by spring 64. In this new position the piston is exposed to pressure on its forward face over area $A_1$ which pressure is isolated from area $A_2$ for cavity 102 is vented to cavity 90 through piston valve 66. The net effect in this case is a reduction of torque output and an increase in rate of pitch change for constant pump flow, due to an increased velocity of piston 30.

The position of valve 66 determines whether the motor is to operate as a high torque or high pitch rate device.

Although this valve 66 is shown controlled by the position of the low pitch stop lugs 54 and ring 63, the valve actuating means may be any device, automatic or manual.

Operation

Let us consider that the double area piston 30 is displaced to the left until shoe 136 engages stop levers 54. This is the position of the pitch change motor at airplane take-off. Adjustment is made in the axial position of the stop levers 54 to obtain desired take-off angle. The blades operating in the positive angles produce a moment which tends to move the piston outboard against stops 54 as heretofore explained. As the airplane gains forward speed, oil is directed through the high pitch tube 100 and port 98 into cavity 92. This chamber is in communication with cavity 102 through port 112, annulus 106 of valve 66 and line 104. Pressure is required to translate the piston inboard or toward the right against the low pitch tendency of the blades. The volume 90 in back of the piston is kept full of oil but at low pressure. The oil displaced by the piston in chamber 90 is returned through port 70 to the propeller control. Pitch regulation above the low pitch stop levers is obtained by flow under pressure to and from cavity 92 and 102 in front of the piston.

Figure 5:
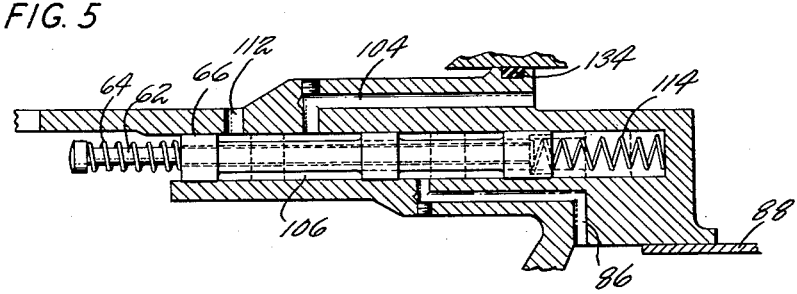
FIG. 5 is a fragmentary, enlarged showing of the valve shown in FIG. 2.

When the airplane slows down to approach a landing the piston 30 moves forward or to the left to the limiting position where shoe 136 of piston 30 will again contact the low pitch stop levers 54. After the airplane has landed and is coasting on the wheels, the pilot may reverse the propeller blade pitch to obtain a more rapid deceleration. At the pilot's signal the stop levers 54 may be retracted by means heretofore explained, thereby permitting piston 30 to move to its phantom position of FIG. 2 and at the same time moving valve 66 to the position shown in phantom in FIGS. 2 and 5 against the opposition of spring 114. With valve 66 in this phantom position the actuating fluid entering through line 70 permits oil to enter chamber 102 through line 86, annulus 106 of valve 66 and line 104. The hydraulic fluid in chamber 92 is blocked by valve 66 from passing to cavity 102; however, cavity 90 is placed into communication with cavity 102 such that cavities 90 and 102 are filled with actuating fluid and the pressure over area $A_2$ in each chamber acts in opposite directions on wall 129 so as to cancel their effect. The motion of piston 30 merely causes the fluid in chamber 102 to transfer into chamber 90. Under these circumstances, the only effective area is area $A_1$ in cavity 92 and 90. These are the only cavities requiring fluid replacement due to piston 30 movement; therefore, the speed of piston 30 for constant fluid flow is increased when the valve 66 is in the aft or phantom position as shown in FIG. 2. This is single area and high speed actuation.

The physical characteristics tend to maintain the blades at zero pitch as heretofore explained; therefore pressure must act on the front side of the piston 30 to maintain positive blade angles and on the aft side of piston 30 to maintain negative blade angles. As the latches 54 are removed to go to low pitch, the fluid in chamber 92 is drained under pressure caused by the leftward piston movement until the zero angle is reached. At this time, pressure will be required in chamber 90 to further reverse pitch.

When the pilot wishes to rotate blade 20 toward the 90° or feather position, with the propeller at reverse pitch, he changes the control such that hydraulic fluid is drained from chamber 90 through line 70 and introduced through line 100 to chamber 92 by pumps (not shown). It might here be noted that a higher pressure will exist in line 70 at negative angles and in line 100 for positive angles regardless of flow direction. Blade angle control is accomplished by proper valving such as servo valve 101 in FIG. 2 which may also be used to maintain blades 20 in any desired angular position. Pumps are utilized to supply the hydraulic actuating fluid required to operate the pitch change motion. The fluid passing through line 100 enters chamber 96 through aperture 98 and then enters chamber 92 through aperture 94. Valve 66 will remain in the position shown in phantom until low pitch locks 54 are allowed to return to their forward flight position. Since valve 66 is blocking the admission of hydraulic fluid from cavity 92 into cavity 102, and since as previously described, cavities 90 and 102 are in communication, the movement toward the right of piston 30 will displace the fluid as influenced by area $A_1$ only so that piston 30 moves to the right at a high rate of speed due to this single area actuation. As the piston is moved to the right, the hydraulic fluid drained from cavity 90 will maintain the cavity 102 full through lines 70 and 86, valve 66 and line 104 and the excess is returned through line 70. It will be noted that all cavities are filled with actuating fluid and there is a total cavity volume balance.

When we consider the movement of the piston from the outboard or reverse position toward positive pitch, the piston 30 moves to the right so as to no longer maintain the collapsed position of the low pitch control locks 54, spring 61 will then return low pitch locks 54 to the position shown in FIG. 2 and will translate locking ring 58 to prevent the return of the piston to reverse position unless again directed by the pilot. Ring 63 moves in unison with ring 58 to the position shown in solid in FIG. 2, thereby permitting actuating valve 66 to return under influence of spring 114 to the position shown in solid in FIG. 2. This occurs only after the propeller blade 20 has rotated at a fast rate of speed past the minimum pitch and potentially disastrous zero degree position. With valve 66 in its new position, hydraulic fluid from cavity 92 will enter cavity 102 through valve 66 and the hydraulic fluid in cavity 90 will be returned to supply through line 70.

In this fashion, we have utilized a two-area oil motor to rotate propeller blades 20 in both an increasing and decreasing pitch direction such that the rate of pitch change is increased in either direction while the blade is passing through the potentially destructive zero degree blade angle position due to single area operation with constant hydraulic fluid capacity, and such that the blade is rotated with maximum force but at lower rate, due to double area actuation, when rotating through blade pitch angles presenting maximum moments of rotational resistance.

Figure 4:
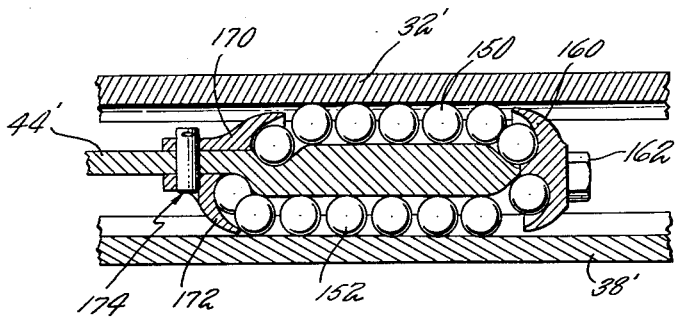
FIG. 4 is a view taken along line 4—4 of FIG. 3.

In installations where the potential friction encountered in spline actuation might be objectionable, applicant suggests the use of ball bearings of the variety depicted in FIGS. 3 and 4. The same reference numerals will be used in describing FIGS. 3 and 4 as were used in describing FIG. 2 but a prime denotation will be used to identify the corresponding FIG. 3 and FIG. 4 parts. Balls 150 may be used between sleeves 32' and 44' while balls 152 may be used between sleeves 38' and 44'. The balls of the bearings are divided into groups with each group located in a double spiral groove such as 154 and comprises two rows of balls in a continuous chain or ring; namely a work row 156 which actually transmits and carries the load between the sleeve such as 38' and a loose fitting return row 158, through which the balls are merely returned for readmission to work row 156. Each end of helical grooves such as 154 is blocked off by end plug such as 160 which is attached to sleeve 44' by any convenient means such as bolts 162 which are received in bolt holes 164. This end plug 160 serves also to direct balls in transfer between work line 156 and loose fitting line 158 and return. End pieces 170 and 172 serve the same purpose as end piece 160 and are attached to 44′ by means such as pins 174. In this fashion the various sleeves 32′, 44′ and 38′ are caused to efficiently rotate relative to one another under load through the rolling action of the string of balls such as 150 or 152 down a work line 156 and back through a loose fitting return line 158 for readmission to work line 156.

Although the preferred embodiments have been shown and described, it will be apparent that various changes and modifications may be made in the construction and arrangement of the various parts without departing from the scope of this novel concept.

I claim:

1. A drive motor comprising a hydraulically actuated cylinder-piston unit including a cylinder enveloping a piston, means to form sealed compartments in said cylinder on each side of said piston, means to selectively provide hydraulic actuating fluid to said compartments to move said piston with respect to said cylinder, and means to vary the effective volume of each of said compartments to vary piston speed.

2. In a propeller of the aircraft type, a hub having an axis, a plurality of radially extending propeller blades supported by and equally spaced circumferentially about said hub, said blades having drive means at their inner ends, a dome unit comprising an enveloping cylinder attached to said hub and having an inner wall, stationary means located within said cylinder, a piston sealably engaging said cylinder inner wall and said stationary means in sealing engagement to define a first compartment on one side of said piston and a second and third compartment on the opposite side of said piston with said compartments defining working surfaces on opposite sides of said piston, blade rotating means comprising a first sleeve attached to said hub and having spiral splines therein, a second sleeve having spiral splines of opposite hand from said spiral splines of said first sleeve and fixed to said hub for rotation only and further having drive means cooperating with said blade drive means, and a third sleeve attached to said piston and having spiral splines of opposite hand engaging the spiral splines of said first and second sleeves, means to selectively provide pressurized hydraulic fluid at constant volume flow to at least one of said compartments and hence one of said working surfaces on one piston side while extracting an equal amount of hydraulic fluid from the other piston side to cause said piston to move with respect to said cylinder thereby causing said third sleeve to rotate with respect to said first sleeve and hub at a preselected rate and also causing said second sleeve to rotate at a greater rate with respect to said first sleeve and hub to rotate said blades with respect to said hub, and means selectively joining said third compartment to said first and second compartments to vary piston speed and torque in both directions.

3. In a propeller of the aircraft type, a hub having an axle, a plurality of radially extending propeller blades supported by and equally spaced circumferentially about said hub, said blades having drive means at their inner ends, a dome unit comprising an enveloping cylinder attached to said hub and having an inner wall, a piston within said cylinder and engaging said inner wall in sealing relation, means located within said cylinder and engaging said piston in sealing relation and cooperating with said cylinder to form compartments on each side of said piston, said piston having working surfaces on each of its sides defining a portion of the boundary of said compartments, blade rotating means comprising a first sleeve attached to said hub and having spiral splines therein, a second sleeve having spiral splines of opposite hand from said spiral splines of said first sleeve and fixed to said hub for rotation only and further having drive means cooperating with said blade drive means, and a third sleeve attached to said piston and having spiral splines of opposite hand engaging the spiral splines of said first and second sleeves, means to selectively provide actuating fluid to one side of said piston at constant volume flow while draining an equal volume of actuating fluid from the other side of said piston to cause said piston to move with respect to said cylinder, and means selectively joining compartments to vary the effective volume of at least one of said compartments and hence the area of at least one of said working surfaces to vary piston speed and torque in both directions.

4. In a propeller of the aircraft type, a hub having an axis, a plurality of radially extending propeller blades supported by and equally spaced circumferentially about said hub, said blades having drive means at their inner ends, a dome unit comprising an enveloping cylinder attached to said hub and having an inner wall, stationary means located concentrically within said cylinder, a piston within said cylinder and sealably engaging said cylinder inner wall and said stationary means to define a first compartment on one side of said piston and a second and third compartment on the other side of said piston with said first compartment defining a first effective area against said one side of said piston while said second and third compartments define second and third effective areas on said other side of said piston of a sum substantially equal to said first effective area, blade rotating means comprising a first sleeve attached to said hub and having spiral splines therein, a second sleeve having spiral splines of opposite hand from said spiral splines of said first sleeve and attached to said hub for rotation only and further having drive means cooperating with said blade drive means, and a third sleeve attached to said piston and having spiral splines of opposite hand engaging the spiral splines of said first and second sleeves, means to provide hydraulic fluid of selected pressure and at constant volume flow to said second compartment while providing relatively low pressure fluid to said first and third compartments to cause said piston to move in a first direction at a first rate of speed with respect to said cylinder thereby causing said third sleeve to rotate with respect to said first sleeve and hub at a preselected rate and also causing said second sleeve to rotate at a greater rate with respect to said first sleeve and hub to rotate said blades with respect to said hub at a first speed, and fully automatic means to provide hydraulic fluid of selected pressure and at said constant volume flow to said second and third compartments while providing relatively low pressure fluid to said first compartment to cause said piston to move in said first at a second rate of speed slower than said first rate of speed and at increased torque with respect to said cylinder to rotate said blades with respect to said hub at a second speed slower than said first speed.

5. In a propeller of the aircraft type, a hub having an axis, a plurality of radially extending propeller blades supported by and equally spaced circumferentially about said hub, said blades having drive means at their inner ends, a dome unit comprising an enveloping cylinder attached to said hub and having an inner wall, stationary means located concentrically within said cylinder, a piston within said cylinder and sealably engaging said cylinder inner wall and said stationary means to define a first compartment on one side of said piston and a second and third compartment on the other side of said piston with said first compartment defining a first effective area against said one side of said piston while said second and third compartments define second and third effective areas on said other side of said piston of a sum substantially equal to said first effective area, blade rotating means comprising a first sleeve attached to said hub and having spiral splines therein, a second sleeve having spiral splines of opposite hand from said spiral splines of said first sleeve and attached to said hub for rotation only and further having drive means cooperating with said blade drive means, and a third sleeve attached to said piston and having spiral splines of opposite hand engaging the spiral splines of said first and second sleeves, first means to provide pressurized hydraulic fluid at constant volume flow to said first compartment while extracting an equal amount of hydraulic fluid from said second and third compartments to cause said piston to move with respect to said cylinder in a first direction at a relatively low rate of speed and at high torque thereby causing said third sleeve to rotate with respect to said first sleeve and hub at a preselected rate and also causing said second sleeve to rotate at a greater rate with respect to said first sleeve and hub to rotate said blades with respect to said hub at a relatively low rate of speed, second means to provide pressurized hydraulic fluid at constant volume flow to said second and third compartments while extracting an equal amount of hydraulic fluid from said first compartment to cause said piston to move with respect to said cylinder in a direction opposite to said first direction at a relatively low rate of speed at high torque to rotate said blades with respect to said hub at a relatively low rate of speed, and means actuatable during operation of said first and second means to join said first and third compartments thereby increasing the speed of said piston with respect to said cylinder and the speed of rotation of said blades with respect to said hub.

6. In a propeller of the aircraft type, a hub having an axis, a plurality of radially extending propeller blades supported by and equally spaced circumferentially about said hub, said blades having drive means at their inner ends, a dome unit comprising an enveloping cylinder attached to said hub and having an inner wall, stationary means located concentrically within said cylinder, a piston within said cylinder and sealably engaging said cylinder inner wall and said stationary means to define a first compartment on one side of said piston and a second and third compartment on the other side of said piston with said first compartment defining a first effective area against said one side of said piston while said second and third compartments define second and third effective areas on said other side of said piston of a sum substantially equal to said first effective area, blade rotating means comprising a first sleeve attached to said hub and having spiral splines on its inner surface, a second sleeve having spiral splines on its outer surface of opposite hand from said spiral splines on said first sleeve and attached to said hub for rotation only and further having drive means cooperating with said blade drive means, a third sleeve attached to said piston and located between said first and second sleeves, and anti-friction bearing chains interposed between said third sleeve and said first and second sleeves and engaging said spiral splines to serve as a substantially friction-free connection between said third cylinder and said first and second cylinders at a relatively low rate of speed, second means to provide pressurized hydraulic fluid at constant volume flow to said second and third compartments while extracting an equal amount of hydraulic fluid from said first compartment to cause said piston to move with respect to said cylinder in a direction opposite to said first direction at a relatively low rate of speed at high torque to rotate said blades with respect to said hub at a relatively low rate of speed, and fully automatic means actuatable during operation of said first and second means to join said first and third compartments thereby increasing the speed of said piston with respect to said cylinder and the speed of rotation of said blades with respect to said hub.

References Cited in the file of this patent

UNITED STATES PATENTS

| | | |
|---|---|---|
| 446,799 | Thorpe | Feb. 17, 1891 |
| 2,502,547 | Adams et al. | Apr. 4, 1950 |
| 2,515,037 | Hardy | July 11, 1950 |
| 2,588,166 | Sacchini | Mar. 4, 1952 |
| 2,661,599 | Folmer | Dec. 8, 1953 |
| 2,694,942 | Hellen | Nov. 23, 1954 |
| 2,756,608 | Greenough | July 31, 1956 |
| 2,792,064 | Smith | May 14, 1957 |

FOREIGN PATENTS

| | | |
|---|---|---|
| 629,540 | Great Britain | Sept. 22, 1949 |

UNITED STATES PATENT OFFICE
CERTIFICATE OF CORRECTION

Patent No. 2,993,543

July 25, 1961

Arthur N. Allen, Jr.

It is hereby certified that error appears in the above numbered patent requiring correction and that the said Letters Patent should read as corrected below.

Column 5, line 57, for "axle" read -- axis --.

Signed and sealed this 12th day of December 1961.

(SEAL)
Attest:

ERNEST W. SWIDER
Attesting Officer

DAVID L. LADD
Commissioner of Patents

USCOMM-DC